United States Patent
Crites et al.

(10) Patent No.: US 7,600,233 B2
(45) Date of Patent: Oct. 6, 2009

(54) FLEXIBLE INTERFACE FOR CONTROLLING STREAMING DATA IN PASSIVE STREAMING PLUG-INS

(75) Inventors: Brian D. Crites, Sammamish, WA (US); Robin Speed, Kirkland, WA (US); Geoffrey Dunbar, Kirkland, WA (US); Serge Smirnov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 837 days.

(21) Appl. No.: 10/896,456

(22) Filed: Jul. 22, 2004

(65) Prior Publication Data

US 2005/0005274 A1  Jan. 6, 2005

Related U.S. Application Data

(63) Continuation of application No. 09/629,289, filed on Jul. 31, 2000, now Pat. No. 6,934,954.

(51) Int. Cl.
*G06F 13/00* (2006.01)
(52) U.S. Cl. ........................ 719/328; 719/316; 709/231
(58) Field of Classification Search .................. 719/316, 719/328; 709/231
See application file for complete search history.

(56) References Cited

U.S. PATENT DOCUMENTS

| 5,339,421 | A | | 8/1994 | Housel, III |
| 5,386,568 | A | | 1/1995 | Wold et al. |
| 5,630,132 | A | | 5/1997 | Allran et al. |
| 6,092,128 | A | * | 7/2000 | Maas et al. ................... 710/57 |
| 6,667,972 | B1 | * | 12/2003 | Foltan et al. ................. 370/354 |
| 6,704,793 | B1 | * | 3/2004 | Oh et al. ...................... 709/236 |
| 6,826,523 | B1 | * | 11/2004 | Guy et al. ...................... 703/22 |

* cited by examiner

*Primary Examiner*—Andy Ho

(57) ABSTRACT

A flexible interface that enables an application to communicate directly with processing modules to easily control the processing of streaming data. The interface provides basic commands for applications to use to communicate with processing modules and provides the flexibility to adapt to changing standards. The interface enables an application to set the type of input and output data formats of a processing module and control when the processing module processes input data and generates output data. The processing modules enumerate its capabilities by category, by media type, or by both category and media type. Processing modules are registered by class ID, category, whether the application needs a key, the number and types of input data types, and the number and type of output data types to register.

34 Claims, 3 Drawing Sheets

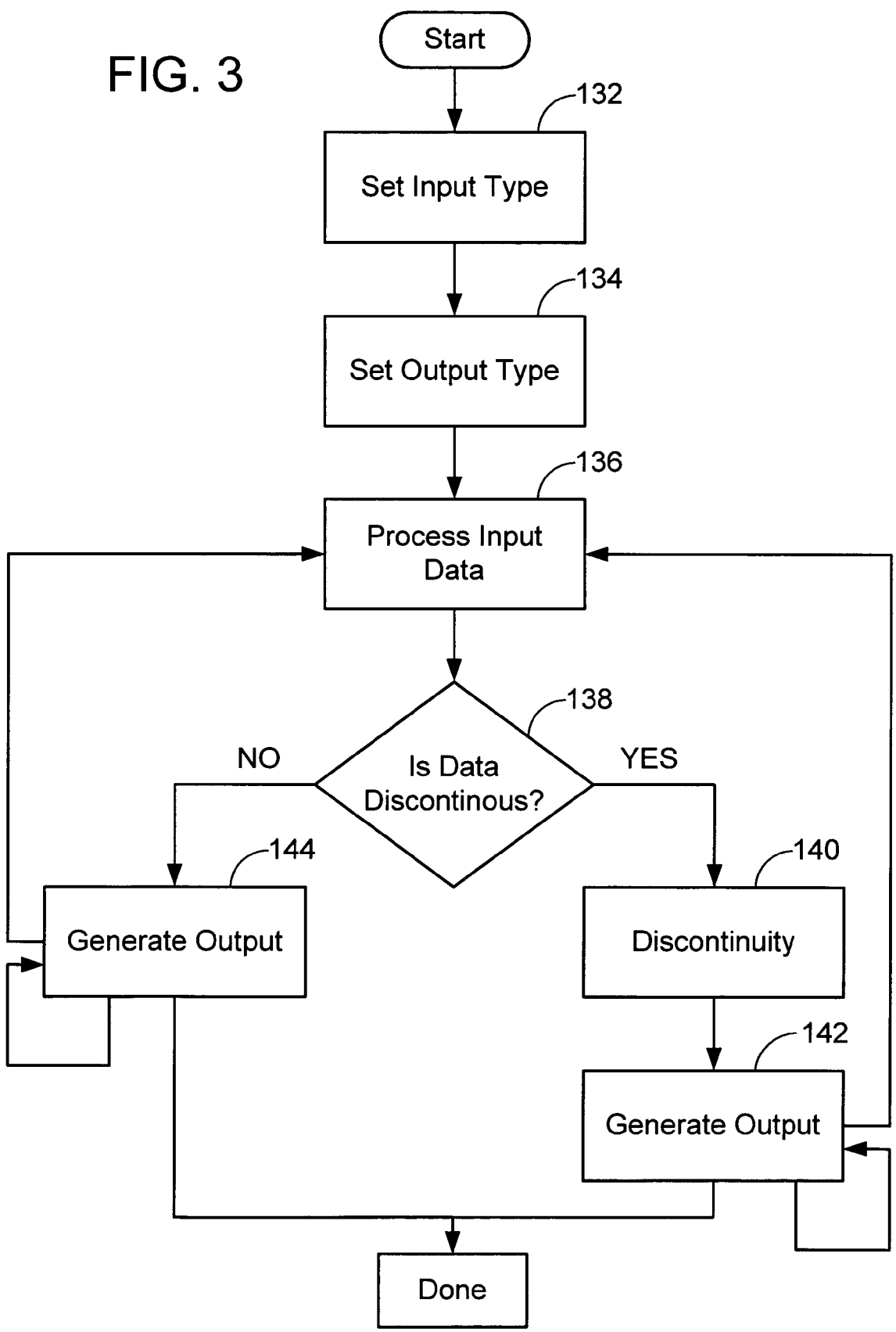

FLEXIBLE INTERFACE FOR CONTROLLING STREAMING DATA IN PASSIVE STREAMING PLUG-INS

CROSS-REFERENCE TO RELATED PATENT APPLICATIONS

This patent application is a continuation of U.S. patent application Ser. No. 09/629,289, filed Jul. 31, 2000, which issued as U.S. Pat. No. 6,934,954 on Aug. 23, 2005, which is hereby incorporated in its entirety.

TECHNICAL FIELD

This invention relates generally to electronic data processing, and, more particularly, to managing the flow of streaming data through a processing module in a computer system.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2000, Microsoft Corporation, All Rights Reserved.

BACKGROUND OF THE INVENTION

Continued advances in computer technology have lead to an explosion in the use of multimedia applications. Computer based multimedia, the combination of video and audio in a digital format for viewing on a computer, involves a multitude of electronic circuits and subsystems. It is estimated that more than 100 million computers are now equipped with multimedia hardware and software. Nearly every new personal computer manufactured today includes some form of multimedia. Furthermore, digital products having some form of multimedia, such as cameras and video recorders, are now hitting the market in a dizzying succession. Multimedia has not only turned the computer into an indispensable information, education, and entertainment tool, but it has also revolutionized the way society works, entertains, and stays informed. Multimedia has also helped drive the computer industry to provide tools that can be used by novice computer users making computers nearly as prevalent as radios and televisions.

Multimedia is also becoming increasingly prevalent in the Internet realm as the growth of the Internet steadily and rapidly continues. A technique known as streaming has been developed for multimedia applications that allows data to be transferred so that it can be processed as a steady and continuous stream. This has the benefit that data can be displayed before the entire file has been transmitted, a must for large multimedia files. Streaming technologies are becoming increasingly important with the growth of the Internet because most users do not have fast enough Internet access to download large multimedia files quickly.

Streaming data almost always requires some form of processing among various modules or filters in a system. Compression and decompression of audio and video data as well as the use of software to create special effects on that data are typical of the types of processing applied to streaming data. For example, a video clip might require MPEG decoding in a dedicated hardware module, rasterizing the video fields in another hardware module, digital filtering of the audio in a software module, insertion of subtitles by another software module, parsing audio data to skip silent periods by a software module, D/A conversion of the video in a video adapter card, and D/A conversion of the audio in a separate audio card.

As these technologies were developed to process streaming data, the concept of a graph was introduced for specifying the connections among the modules through which a data stream must pass in an effort to increase the data processing speed. FIG. 4 is representative of the graph concept. In these graphs, an application 36 communicates with a graph manager 400 to indicate what the application wants done. The graph manager selects which filter modules 402, 404, 406 to use and the modules 402, 404, 406 within the graph negotiate directly with each other. Protocols have been developed to specify the flow of data through a graph, and to specify the control protocol that adjacent modules in the graph use to communicate with each other to request and accept the data. During connection of modules in a graph, these protocols define a pre-defined fixed sequence of data flow 408 and control connection negotiations 410 in a graph. A typical negotiation sequence negotiates the following in order: the interface, the medium, the data format, the allocators, and the master clock.

These implementations have several limitations. One limitation in these systems is that an application is forced to use a graph manager to select which modules to use and is not allowed to select the medium, the format to use, the allocators, the threads, etc. Another limitation is that the modules used for encoding and decoding use essentially different streaming processes and have different interfaces for audio and video and for compression and decompression.

Accordingly, there exists a continued need for further efficiencies in processing streaming and related types of data by providing control mechanisms that achieve the efficiency of a dedicated protocol while allowing enough flexibility to use different data types, different modules, and different configurations in the environment of streaming data through multiple processing modules.

SUMMARY OF THE INVENTION

In view of the above described problems existing in the art, the present invention provides a flexible interface that enables an application to communicate directly with processing modules and easily control the processing of streaming data. The interface provides basic commands that allow applications to communicate with processing modules and adapt to changing standards.

The interface enables an application to set the input-data format of the input to a processing module and set the output-data format of the output of the processing module. Once the input-data and output-data formats are set, the application uses the interface to control when the processing module both processes input data and generates output data. The processing module sets a flag to signal the application when the module is unable to generate all the output data for the associated input data.

Applications know the capabilities of processing modules by having the modules enumerate their capabilities via the interface. A processing module enumerates its capabilities by category, by media type, or by both category and media type. Processing modules use the interface to register themselves and are registered by class ID, category, whether the application needs a key, the number and types of input data types, and the number and type of output data types to register.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 3 is a flowchart of a method to control an object in accordance with the teaching of the instant invention.

DETAILED DESCRIPTION OF THE INVENTION

Figure 1:
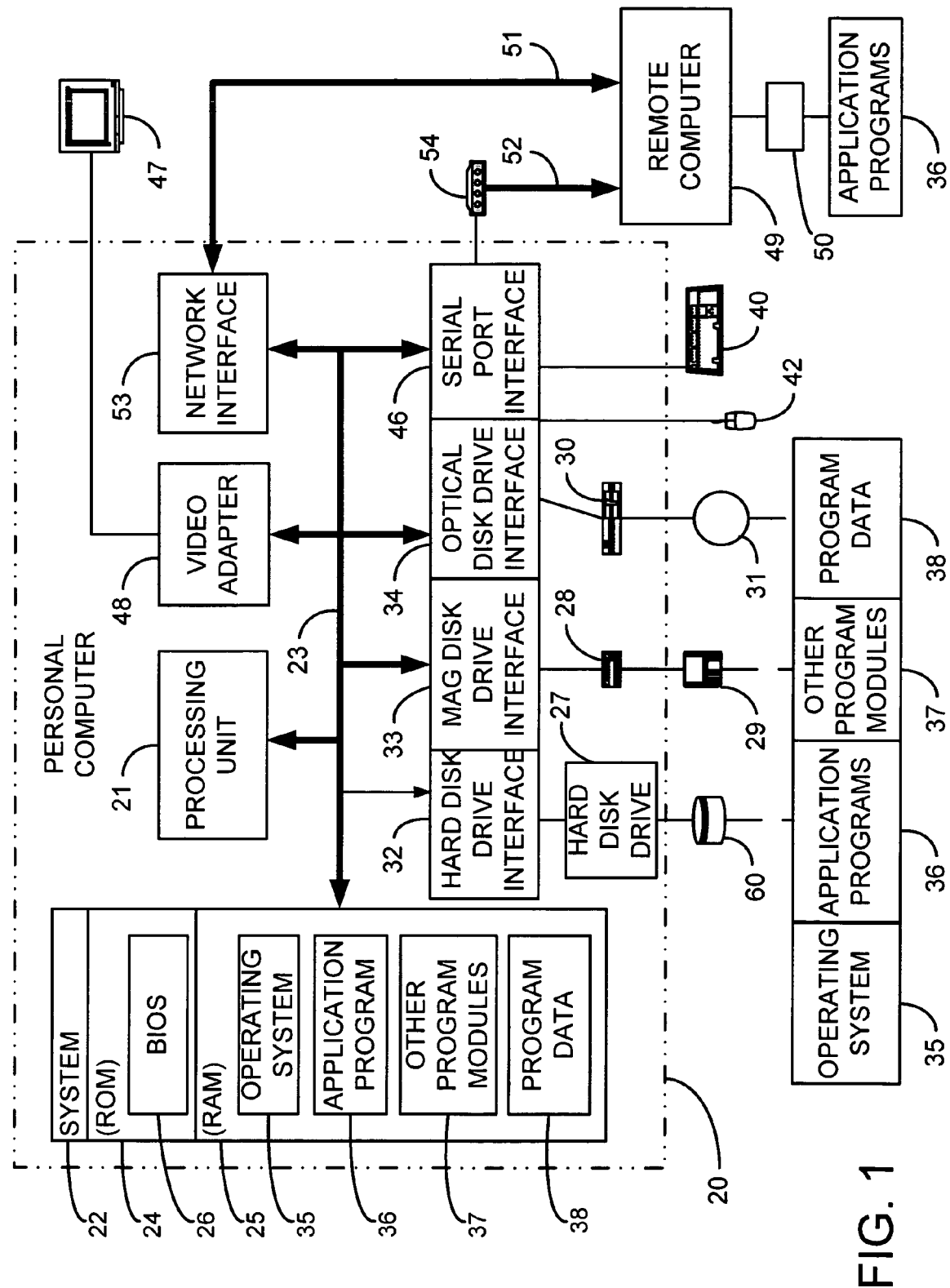
FIG. 1 is a block diagram generally illustrating an exemplary computer system on which the present invention resides.
Figure 4:
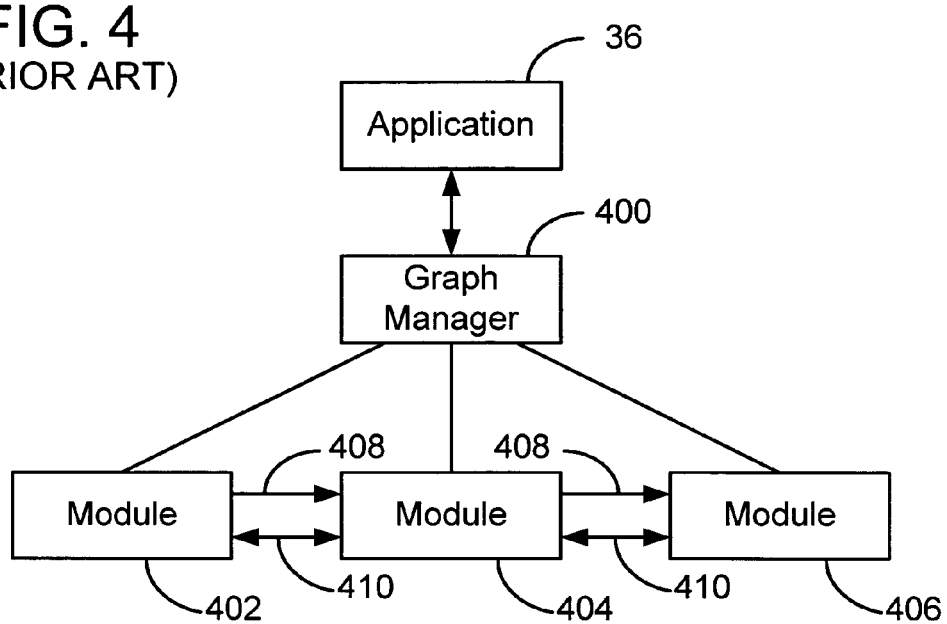
FIG. 4 shows a prior art graph control concept.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
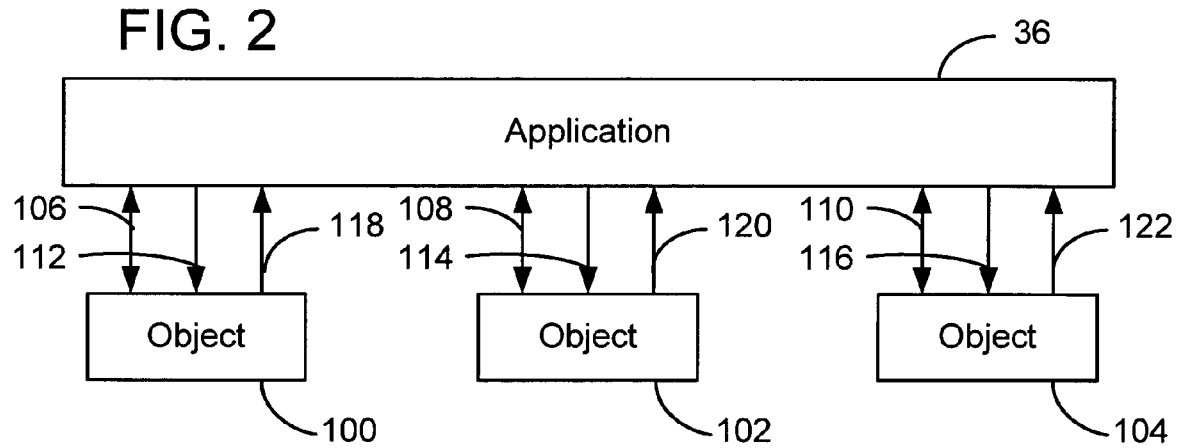
FIG. 2 is a block diagram of an application controlling objects in accordance with the teaching of the instant invention.

FIG. 2 shows a representative block diagram of data flow from the application 36 to objects 100, 102, 104 in the operating system 35. Application 36 is in communication with objects 100, 102, 104 via control lines 106, 108, 110. Application 36 represents any application that uses objects to manipulate data. For example, application 36 could be a computer game, a media player such as Windows Media™, etc. An object can be designed to perform any type of data processing. For example, an object could be an encoder, a decoder, a reader, a renderer, an audio effect processor, a video effect processor, etc. The application 36 sends data to the objects on input data connections 112, 114, 116 via input buffers 124, 126, 128 and receives data from objects on output data connections 118, 120, 122 via output buffers 125, 127, 129. The input buffers 124, 126, 128 and output buffers 125, 127, 129 are located in RAM 25 (see FIG. 1). While FIG. 2 only shows objects having one input and output data connection, those skilled in the art will recognize that each object may have any number of input and output data connections.

The invention will be described in the context of the Windows operating system from Microsoft Corporation. However, it should be understood that the instant invention is applicable to other operating systems. FIG. 3 shows a flow chart of the steps taken to process data in accordance with the instant invention. For the following description, application 36 shall be communicating with object 100, although it should be recognized that in general, application 36 communicates with all objects. Exemplary commands of one embodiment shall be used to illustrate the instant invention. See Appendix 1 for the specific details of the exemplary command. Appendix 1 provides a listing of commands for one specific implementation of the invention. It should be noted that the exemplary command is not limited to the specific implementation of this embodiment and the invention is not limited to the commands of Appendix 1 or to the Windows operating system. Those skilled in the art will recognize that the functions of the exemplary command can be implemented in other operating systems.

As standards change and new media types are created, the instant invention provides the application 36 the capability to determine the media types (i.e., data format) that an input of an object can accept using the GetInputType command and the media types that an object can output using the GetOutputType command. The minimum size of an object's input and output buffer sizes can be found using the GetInputSizeInfo and GetOutputSizeInfo commands. Using the minimum size of input and output buffers guarantees that some data is processed. These sizes should be determined after the media type has been set because a different buffer size may be required for different media types.

The application 36 sets the media type of the input stream of object 100 using the SetInputType command (step 132) and the output media type of the output stream of object 100 using the SetOutputType command (step 134). The input media type and the output media type can be set before data is processed or while data is being processed. They are set in the context of each other and in the context of whether data is being streamed. The object rejects an input media type or an output media type if the media type is inconsistent with other media types or the resources allocated. In general, the media type of input streams should be set before the media types of output streams. Some objects may not enumerate media types for its output until after the input stream media type is set. For example, a decoder with one input stream and one output stream might only enumerate media types for its output when the media type for its input has been set. Once the media types are set, the application 36 commands the object 100 to process data in an input buffer using the Process Input command (step 136). The application 36 may want to command the object to process the input data before setting the output media type. The instant invention provides the application 36 flexibility by not requiring the application 36 to set the output media type before commanding the object 100 to process input data. The application 36 merely commands the object 100 to process input data before setting the output media type. Upon receiving the command to process input data, the object 100 either processes all the data in the buffer or holds the buffer waiting until it is commanded to generate output data. When the object 100 holds the buffer, the application 36 is notified so that it does not reuse the buffer.

The object 100 may want to hold on to multiple input buffers. One reason for this to occur is for the object 100 to perform a lookahead function. The application 36 knows when the object 100 may hold on to multiple input buffers by detecting a flag set by the object when the application gets information about the input stream using the GetInputStreamInfo command. The application 36 can determine the minimum size of an object's input buffer size required to guarantee that some data is processed using the GetInputSizeInfo command. The application allocates a sufficient number of buffers for the object to avoid running out of buffers, the number defined by $$\text{number} \geq \frac{(minimumdatasize + 2*(buffersize-1))}{buffersize}$$

where minimumdatasize is the minimum required size of an object's input buffer and buffersize is the size of the buffers allocated by the application.

There are instances when the input data stream is discontinuous. For example, this could occur when there is a large gap in the data, when no more data is expected, or when the format of the data changes. Some objects may need to output extra data when there is no more input data or when there is a logical break in the input data. For example, some audio encoder objects generate partial data samples, some encoder objects perform lookahead, and some decoder objects defer reference frames so that the first decoded frame generates no output and the last decoded frame forces out the last reference frame. The application 36 detects when the input stream data is discontinuous (step 138). If the input stream data is discontinuous, the application 36 informs the object 100 that the input stream data is discontinuous using the Discontinuity command (step 140). The object 100 generally should generate all output data that can be generated from the data already received before accepting any more input data when the application commands the object to generate data using the Process Output command (step 142). If the input stream data is continuous, the application 36 commands the object 100 to process the data to generate output data using the Process Output command (step 144). In some situations, output data may not be generated for input data. For example, an output buffer 125 may not be filled if the media type being used requires complete samples to be generated and not enough input data has been received to generate a complete output buffer 125. In one embodiment, object 100 provides a status to indicate to the application 36 that there is no output data to process.

The object 100 sets a flag in the output buffer 125 associated with an output data stream to signal the application 36 that more buffers are needed to generate the output. The flag allows the application 36 to avoid allocating an output buffer before it is needed. For example, the flag may be set because an output buffer 125 may not be large enough for all the output data, or the object 100 may output data in a number of portions due to the way a particular media type is defined to flow, or the object 100 needs to output a timestamp with the next batch of data. When the application 36 detects this flag, the application 36 continues to command the object 100 to generate output data until the flag is no longer present. If the input data to the object is timestamped, the object timestamps the output data as the object generates output data. Once the output data is generated, the application 36 can continue to process data by repeating the commands to process input data and output data.

New objects are registered in the operating system 35 using the DMORegister command. In the exemplary embodiment, the objects are registered in the system registry. The object registers the class ID under which the object is registered, the category of the object, whether a key is needed to use the object, and the number and data types of input and outputs of the object. The objects can be enumerated by category, by media type, or by category and media type using the DMOEnum command.

An interface that enables an application to directly control streaming data processing and to directly communicate with processing modules has been described. Applications set the input and output media types of an object, directly control when an object processes input data or generates output data, and knows the media types an object supports by having objects enumerate their capabilities.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer-readable medium having computer-executable instructions for performing the steps of:

commanding an object to set a first data type on an input of the object;

commanding the object to set a second data type on an output of the object;

commanding the object to process data of the first type received at the input of the object;

commanding the object to generate output data of the second type at the output of the object;

determining a first data type that the object can process on the input;

determining a second data type that the object can support on the output;

querying the object for a minimum input buffer size required to guarantee that some data is processed when the object is commanded to process data of the first type;

detecting when an incomplete status flag is set;

re-commanding the object to generate output data at the output of the object if the incomplete status flag is set; and if the incomplete status flag is set, waiting for the incomplete status flag to reset before performing the step of commanding the object to process data at the input of the object.

2. The computer-readable medium of claim 1 wherein the step of re-commanding the object to generate output data on the output of the object further comprises repeating the step of re-commanding the object to generate output data for as long as the incomplete status flag is set.

3. The computer-readable medium of claim 1 wherein the step of commanding the object to set the first data type comprises the step of commanding the object to set the first data type to a streaming media input type and the step of commanding the object to set the second data type comprises the step of commanding the object to set the second data type to a streaming media output type.

4. The computer-readable medium of claim 3 wherein the step of commanding the object to set the first data type to a streaming media input type comprises the step of commanding the object to set the streaming media input type to a streaming audio input media type and the step of commanding the object to set the second data type to a streaming media output type comprises the step of commanding the object to set the streaming media output type to a streaming audio output media type.

5. The computer-readable medium of claim 3 wherein the step of commanding the object to set the first data type to a streaming media input type comprises the step of commanding the object to set the streaming media input type to a streaming video input media type and the step of commanding the object to set the second data type to a streaming media output type comprises the step of commanding the object to set the streaming media output type to a streaming video output media type.

6. The computer-readable medium of claim having further computer-executable instructions for performing the step of querying the object for a minimum output buffer size required to guarantee that some data is output when the object is commanded to generate output data.

7. The computer-readable medium of claim 1 having further computer-executable instructions for performing the step of informing the object that the data is discontinuous on the input of the object.

8. The computer-readable medium of claim 1 having further computer-executable instructions for performing the step of informing the object that data is discontinuous on the input of the object.

9. The computer-readable medium of claim 1 wherein the step of commanding the object to generate output data on the output of the object further comprises the step of detecting that an output flag has been set to indicate that the output data can be generated prior to commanding the object to generate output data on the output of the object.

10. A computer-readable medium having computer-executable instructions for performing the steps of:

setting an input data type for an input of an object in response to a command from an application;

setting an output data type for an output of the object in response to a command from the application;

processing input data on the input of the object in response to a command from the application to process data on the input;

generating output data on the output of the object in response to a command from the application to generate data on the output;

detecting when an incomplete status flag is set;

repeating the generating output data on the output of the object if the incomplete status flag is set; and if the incomplete status flag is set, waiting for the incomplete status flag to reset before performing the step of processing input data on the input of the object.

11. The computer-readable medium of claim 10 wherein the step of setting the input and output data types comprises the step of setting the input data type to a streaming media input type and of setting the output data type to a streaming media output type.

12. The computer-readable medium of claim 11 wherein the step of setting the streaming media input type comprises the step of setting the streaming media input type to a streaming audio input media type and the step of setting the streaming media output type comprises the step of setting the streaming media output type to a streaming audio output media type.

13. The computer-readable medium of claim 11 wherein the step of setting the streaming media input type comprises the step of setting the streaming media input type to an input streaming video media type and the step of setting the streaming media output type comprises the step of setting the streaming media output type to an output streaming video media type.

14. The computer-readable medium of claim 10 having further computer-executable instructions for performing the step of setting an incomplete status flag upon receiving a command from the application to generate output data if all output data for the associated input data cannot be generated.

15. The computer-readable medium of claim 14 having further computer-executable instructions for performing the step of resetting the incomplete status flag upon generating all output data for the associated input data.

16. The computer-readable medium of claim 14 having further computer-executable instructions for performing the steps of buffering input data internally when there is insufficient input data to generate output data.

17. The computer-readable medium of claim 10 having further computer-executable instructions for performing the step of providing an indication that the output data can be generated.

18. The computer-readable medium of claim 10 having further computer-executable instructions for performing the step of enumerating types of data that are supported in response to a query from the application.

19. The computer-readable medium of claim 10 having further computer-executable instructions for performing the step of generating all data that can be processed in response to notice from the application that data is discontinuous on the input.

20. The computer-readable medium of claim 10 having further computer-executable instructions for performing the step of setting a buffer flag in response to a query to provide information about an input data stream, the buffer flag indicating that a plurality of input buffers may be held.

21. The computer-readable medium of claim 20 having further computer-executable instructions for performing the steps of:

setting a lookahead value, the lookahead value indicating a maximum size of data held by the object; and providing the lookahead value to the application in response to a command from the application to provide buffer size requirements for the input data stream.

22. The computer-readable medium of claim 10 having further computer-executable instructions for performing the step of registering an existence with an operating system.

23. The computer-readable medium of claim 22 wherein the step of registering an existence with an operating system comprises:

identifying a class ID;

identifying a category;

identifying whether a use is keyed;

identifying a number of input data types to register;

identifying the input data types;

identifying a number of output data types to register; and identifying the output data types.

24. A computer-implemented of configuring and controlling an object for processing data, the method comprising the steps of:

issuing from a process a command to set a data type at a data input of an object;

issuing from a process a command to set a data type at a data output of the object;

setting the data type for each of the data input and data output of the object in response to the commands;

processing data presented to the input of the object in response to a command from an application to begin processing data;

generating output data derived from the input data in response to a command from the application;

issuing an incomplete status flag if the object is unable to generate all the output data for associated input data;

reissuing from the process a command to generate output data upon receiving the incomplete status flag; and issuing a reset status flag upon generating all output data for the associated input data.

25. The method of claim 24 further comprising the step of issuing an indication that the object can generate output data.

26. The method of claim 24 further comprising the steps of:

issuing from the process a data type query for the types of data the object supports; and enumerating the types of data supported in response to the data type query.

27. The method of claim 24 further comprising the steps of:

issuing from the process an input discontinuity notice; and generating all data that can be processed in response to the input discontinuity notice.

28. The method of claim 24 further comprising the steps of:

issuing from the process an information query to provide information about an input stream; and setting a buffer flag indicating that a plurality of input buffers may be held in response to the information query.

29. The method of claim 28 further comprising the steps of:

issuing from the process a buffer size requirement command; and setting and issuing a lookahead value in response to the buffer size requirement command, the lookahead value indicating a maximum size of data held by the object.

30. A computer-implemented interface for enabling applications to control modules for processing streaming media data, the interface comprising:

a first command to set an input data format of the processing module;

a second command to set an output data format of the processing module;

a third command to process data on an input of the processing module;

a fourth command to generate data on an output of the processing module;

a fifth command to detect when an incomplete status flag is set;

a sixth command to repeat the fourth command to generate data on the output of the processing module if the incomplete status flag is set; and if the incomplete status flag is set, a seventh command to wait for the incomplete status flag to reset before performing the third command to process data on the input of the processing module.

31. The interface of claim 30 further comprising an eighth command to enumerate the capabilities of a processing module by at least one of a category and a media type.

32. The interface of claim 30 further comprising: a ninth command to determine a minimum input buffer size of a processing module required to guarantee that data is processed; and a tenth command to determine a minimum output buffer size of a processing module required to guarantee that data is generated.

33. The interface of claim 30 further comprising: an eleventh command to determine the input data types that a processing module can process; and a twelfth command to determine the output data types that a processing module can generate.

34. The interface of claim 30 further comprising: an eighth command to enumerate the capabilities of a processing module by at least one of a category and a media type; a ninth command to determine a minimum input buffer size of a processing module required to guarantee that data is processed; a tenth command to determine a minimum output buffer size of a processing module required to guarantee that data is generated; an eleventh command to determine the input data types that a processing module can process; and a twelfth command to determine the output data types that a processing module can generate.

* * * * *